United States Patent [19] [11] 4,362,753
Barta [45] * Dec. 7, 1982

[54] MEAT CARCASS SANITIZING PROCESS

[76] Inventor: Kent S. Barta, 801 Monroe, Jefferson City, Mo. 65101

[*] Notice: The portion of the term of this patent subsequent to Jan. 13, 1998, has been disclaimed.

[21] Appl. No.: 306,695

[22] Filed: Sep. 29, 1981

Related U.S. Application Data

[63] Continuation-in-part of Ser. No. 199,195, Oct. 21, 1980, abandoned, which is a continuation-in-part of Ser. No. 144,030, Apr. 28, 1980, abandoned.

[51] Int. Cl.$^3$ .............................................. A23B 4/08
[52] U.S. Cl. ................................... 426/332; 426/335; 426/532; 426/641; 426/652
[58] Field of Search ................ 426/92, 304, 310, 327, 426/332, 335, 532, 641, 652; 422/32, 37, 40

[56] References Cited

U.S. PATENT DOCUMENTS

| | | | |
|---|---|---|---|
| 1,681,009 | 8/1928 | Petersen | 426/332 X |
| 3,745,026 | 7/1973 | Hansen et al. | 426/332 |
| 3,819,329 | 6/1974 | Kaestner et al. | 426/335 X |
| 3,958,020 | 5/1976 | de Vries | 426/332 X |
| 3,996,386 | 12/1976 | Malkki et al. | 426/641 X |
| 4,021,585 | 5/1977 | Svoboda et al. | 426/332 |

OTHER PUBLICATIONS

Lillard, "Levels of Chlorine & Chlorine Dioxide of Equivalent Bactericidal Effect in Poultry Processing Water", *J. Food Sci.*, 44:1594 (1979).
Anderson et al., "Efficacies of Three Sanitizers Under Six Conditions of Application to Surfaces of Beef", *J. Food Sci.*, 42:326 (1977).
Anderson et al., "Microbiol Growth on Plate Beef During Extended Storage After Washing & Sanitizing", *J. Food Prot.*, 42:389 (1979).
Emswiler et al., "Bactericidal Effectiveness of Three Chlorine Sources Used in Beef Carcass Washing", *J. Animal Sci.*, 42:1445 (1976).
Firstenberg-Eden et al., "Scanning Electron Microscopic Investigations into Attachment of Bacteria of Teats of Cows", *J. Food Prot.*, 42:305 (1979).
Marcy, "Evaluation of Colony Growth of Bacteria & the Surface Environment of Beef", *J. Milk Food Technol.*, 39:754 (1976).

*Primary Examiner*—Arthur L. Corbin

[57] ABSTRACT

A process for preventing prespoilage proliferation of bacteria on fresh meat utilizes substantially sub-bactericidal concentrations of chlorine dioxide to suppress localized growth of such bacteria for up to at least 3 days post-slaughter. The chlorine dioxide solution is applied immediately post-slaughter and at remote times whenever renewed proliferation of such bacteria may occur. Formation of organic chlorine and oxidative by-product residuals is minimized upon treatment of meat at these chlorine dioxide concentrations.

3 Claims, No Drawings

MEAT CARCASS SANITIZING PROCESS

CROSS-REFERENCE TO RELATED APPLICATIONS

This application is a continuation-in-part of my prior copending application, Ser. No. 199,195, entitled "Meat Sanitizing Process," filed Oct. 21, 1980, now abandoned, which is a continuation-in-part of my prior copending application, Ser. No. 144,030, entitled "Carcass Sanitizing Process," filed Apr. 28, 1980, now abandoned.

BACKGROUND OF THE INVENTION

Modern rapid distribution systems for fresh meats rely upon refrigeration and plant sanitation to provide a wholesome product to the consumer. Although fresh meats in the United States are generally safe and free of hazardous levels of pathogens, the microbial quality may be poor; high levels of nonpathogenic spoilage bacteria, frequently present, dramatically shorten shelf life and affect the taste and appearance of the meat. In response to this problem several states and the Federal Government have adopted or proposed standards regulating the bacterial content of fresh meat.

It is recognized that refrigeration is not a complete solution to spoilage problems because the principal spoilage bacteria are psychrotrophes which grow well at 5°–15° C., or mesotrophes which are adapted to grow at lower temperatures. Ayres, J. C. (*Food Research,* 25:1, 1960) found that the dominant microorganisms growing on refrigerated beef undergoing advanced spoilage comprised the Micrococci and Pseudomonads; even at temperatures as high as 15° C. the growing bacterial population was dominated by motile gram negative rods of the *Pseudomonas generae.*

These Pseudomonads, however, comprise only a minor portion of the initial contaminating population. This population is extremely diverse, and species of Acinetobacter, Moraxella, Flavobacterium, and Aeromonas may be present in substantial numbers (See Jay & Shelef, *Food Technol.,* 22:186 1978), in addition to members of the Enterobacteriace. In the course of early spoilage at refrigerated temperatures, most of these species are displaced by nonproteolytic Pseudomonads. Off-odors characteristic of spoilage are detected when this sub-population grows to a level in excess of $10^7$–$10^8$ organism per square inch of meat surface.

The mechanism of displacement of some generae of bacteria by the Pseudomonads in the early stages of spoilage is not well understood. These organisms are physiologically versatile, and readily attack a wide variety of low molecular weight nitrogenous substances whose by-products of metabolism account for the off-odors associated with meat spoilage. However, it is known that attack of these substances is strongly repressed by glucose which comprises about 0.18 percent of the meat (Gill, C. O., *J. Appl. Microbiol.,* 41:401 1976). Substantial development of the psychrotrophic Pseudomonads, Aeromonas, etc. in early spoilage may thus be preceded by the growth of other organisms which preferentially deplete surface glucose thereby relieving repression of the Pseudomonad development. As the temperature of chilling meat becomes refractory to bacterial growth generally, the Pseudomonads, etc. then emerge as the dominant population.

Bacterial contamination of meat has been the subject of extensive studies whose conclusions are here set forth. The microorganisms present in retail portions are derived principally from the initial bacterial load on the carcass surface immediately post-slaughter; thus, meat portions, such as hamburger, having high bacterial counts are traceable to carcasses having high surface contamination. (For example, see Elliot, et al., *Appl. Microbiol.,* 9:452 1961.) The primary source of such contamination is the gut and hide of the animal itself, although packing house environment (floors, chill room, cutting room, etc.), and handling by packing house workers are all substantial sources of contamination. (Frazier, *Food Micro Biology,* Chapt. 16, 2ed., 1967.)

Contamination of carcasses from these sources is not uniform; initial bacterial counts vary from $10^2$ organisms per square inch, or less, to greater than $10^6$ organisms per square inch (Ingram & Roberts, "The Microbiology of the Red Meat Carcass and the Slaughterhouse," Meat Research Institute publication, Langford, Bristol, England, 1976). This variation in contamination occurs between different zones of the same carcass (including adjacent areas as small as one square inch), and among different carcasses. The relation of the magnitude and composition of initial contamination at any selected site to subsequent bacterial development at the same site has not heretofore been studied. Little is known about the kinetics of prespoilage proliferation of naturally-occurring mixed populations of such bacteria.

Several available processes eliminate bacteria from meat by killing them with a contact disinfectant(s) applied in the form of a spray to the carcass surface during chilling. U.S. Pat. No. 3,745,026 (Hansen) disclosed such a process utilizing 50–200 ppm of aqueous chlorine (hypochlorous acid). U.S. Pat. No. 4,021,585 (Svoboda, et al.) describes an alternative process utilizing 5–50 ppm of aqueous chlorine dioxide. Both processes achieve reduced bacterial counts during the chill cycle (18–24 hrs. post-slaughter) by killing bacteria introduced onto the carcass during slaughter procedures. This is shown by the reduction in viable colony-forming bacteria present at the end of the chill cycle as compared with counts at the beginning of such period after carcasses are conveyed to the chill room from the kill floor.

A major limitation of processes utilizing aqueous chlorine (hypochlorous acid and its calcium or sodium salts) is rapid regrowth of microorganisms on the treated surfaces. Several investigators have reported initial bactericidal action resulting in up to about 3 $\log_{10}$ of reduction in aerobic bacterial counts (Kotula, et al., *J. Anim. Sci.,* 39:674 1974); Bailey, C., "Spray washing of lamb carcasses," 17th European meeting of meat researchers, Bristol, England 1971.) However, others have noted substantial bacterial regrowth during the first 48 hours post-slaughter; rapid regrowth accounts for net increases after initial reductions. (For example, see Anderson, et al., *J. Food Sci.,* 42:326 1977.)

A second major problem with such use of chlorinated contact disinfectants is reaction of the agent with meat components to produce chloro-organic derivatives such as chloro-substituted lipids, and oxidative products. These chemical derivatives may pose a health hazard, especially the class of halomethanes (known to be carcinogenic) formed by reaction of bactericidal levels of hypochlorous acid with humic or other organic substances. Reaction of chlorine dioxide at bactericidal concentrations with meat components results in low but detectable levels of organic chlorine, as noted in Cunningham & Lawrence (*J. Assoc. Off. Anal. Chem.*, 62:482 1979).

Other agents such as inorganic and organic acids have also been applied to carcass surfaces in the form of aqueous sprays, as described in Carpenter, J. A., *Proc. Meat Indust. Res. Conf.*, Chicago, 1972. Use of these agents has not received widespread acceptance because of reported surface damage to the carcass and off-odors and flavors imparted to the meat at bacteriostatic concentrations.

SUMMARY OF THE INVENTION

A principal object of the present invention is to provide a process which suppresses prespoilage proliferation of microorganisms on freshly slaughtered meat surfaces. A further object is to disable generae of bacteria whose transient growth on meat may promote development of the dominant spoilage populations without completely destroying meat microflora. A still further object is to provide a process for bacterial control of fresh meat which minimizes by-products formed by chemical reaction between the treating agent and the carcass surface.

Briefly summarizing, and without limiting the scope hereof, I have discovered that application to meat surfaces of aqueous chlorine dioxide at concentrations too low to be effective as a bactericide nevertheless substantially suppresses prespoilage proliferation of microorganisms. Application of substantially sub-bactericidal levels of chlorine dioxide up to about 4.0 ppm is effective in suppressing growth of the dominant spoilage bacteria and other populations which may promote their proliferation, for at least 3 days after application. At these concentrations, lower levels of reaction by-products are formed than at bactericidal concentrations.

DESCRIPTION OF THE PREFERRED EMBODIMENT

In the present method, aqueous solutions of chlorine dioxide, so weak as to be substantially sub-bactericidal, are applied to meat surfaces immediately post-slaughter, and intermittently during subsequent chilling.

Typically, the chlorine dioxide is generated on site with conventional apparatus and formed into solution with potable water at a concentration of 0.5 to 4.5 ppm (mg/l), preferably about 1.0 to 4.0 ppm, prior to application to meat. The solution so formed is applied to meat surfaces during chilling, as hereinafter more fully described. In addition, the solution may be applied as a carcass wash on the kill-floor upon dehiding.

Conventionally, sanitizing agents are applied as an intermittent spray during chilling as disclosed in U.S. Pat. No. 4,021,585 (Svoboda, et al.). However, any method of applying the chlorine dioxide solution will be effective provided there is substantial contact between fresh solution and the meat during the course of 18 to 24 hour chill post-slaughter. Such alternative methods include, but are not limited to, dipping or misting continuously into the atmosphere at a constant low rate. Treatment of meat with 0.5 to 4.0 ppm chlorine dioxide is expecially effective in avoiding proliferation of surface bacteria when applied intermittently for such intervals and in such volume as prescribed by Interim Chlorination Guidelines of the U.S. Dept. of Agriculture. Further application of the chlorine dioxide solution may be instituted during prolonged storage at remote times post-slaughter to avoid renewed proliferation of bacteria, as may occur upon partial warming of the meat prior to or coincident with boning, breaking, packaging, or shipping operations.

The animal carcass surface immediately post-slaughter and upon dehiding is contaminated by a diverse, mixed population of bacteria ranging in numbers from less than 100 organisms per square inch up to greater than $10^6$ organisms per square inch. Applicant has discovered that an early event in the development of surface spoilage is an apparent sudden, rapid proliferation of organisms in one or more bacterial subpopulations following a latent period of approximately 24 hours during which growth is minimal. Such proliferation is herein termed a "bloom." For purposes of this application, a bloom is defined as an increase in bacterial numbers at any selected meat surface site two square inches in area, of at least 1.0 $log_{10}$, utilizing the assay as hereinafter more fully described in the Examples. A partial bloom is defined herein as 0.5 to 1.0 $log_{10}$ similar increase.

Applicant has further discovered that application to meat surfaces of about 0.5 to 4.0 ppm aqueous chlorine dioxide, as hereinafter set forth, is sufficient to substantially suppress blooms in spoilage generae of bacteria and in other species which may promote or potentiate their development. Such concentrations are substantially sub-bactericidal. In the meat slaughtering field, a bactericidal solution should be effective to kill at least about 85–90 percent of contaminating bacteria, as disclosed in U.S. Pat. No. 4,021,585. That patent shows chlorine dioxide is bactericidal at concentrations minimally 5.0 ppm.

In the present process, application of chlorine dioxide solutions at sub-bactericidal concentrations, that is, too low to achieve reliable 85–90 percent reductions in bacterial numbers, nevertheless suppresses bloom development which is now understood to be an early stage in spoilage. Significantly, such suppression is maintained for at least 3 days post-slaughter in contrast to sanitizing methods utilizing hypochlorous acid in which rapid regrowth is noted within 48 hours. Since the effect of chlorine dioxide is upon bacteria, whose taxonomic distribution is substantially identical on the surface of any species of fresh meat carcass, the present method is adaptable to the processing of fresh meat including, but not limited to, beef, pork, lamb and veal.

Reaction of hypochlorous acid (HOCl) or chlorine dioxide ($ClO_2$) with lipid components of meat may produce a great variety of chemical by-products, including chloro-substituted and oxidative derivatives. (For a comprehensive review, see W. J. Masschelein, *Chlorine Dioxide: Chemistry and Environmental Impact of Oxychlorine Compounds.* Ann Arbor Press: 1979.) Residues of these derivatives in meat may pose a potential health hazard to the consumer. Chlorinated by-products, thought to be formed upon the chemical addition of inorganic chlorine to the double bonds of unsaturated fatty acids, may be suspect because of altered patterns of uptake in animals (Cunningham & Lawrence, *Fd. Cosmet. Toxicol.*, 15:283 1976).

Studies of these chlorination reactions, as hereinafter more fully described in the Examples, indicate that chlorine dioxide reacts very slowly with fatty acid double bonds compared to hypochlorous acid. In reaction with whole fat, chlorine dioxide reacts correspondingly more slowly than hypochlorous acid. The reaction appears to be nearly first order with respect to concentration. Use of chlorine dioxide at the sub-bactericidal levels of the present process will thus minimize formation of chemical by-product residues in meat treated therewith.

Other advantages of the present process will become apparent from the following examples.

EXAMPLE I

The following tests, utilizing a new bacteriological technique, demonstrate that chlorine dioxide applied to meat in a concentration of 0.5 to 4.5 ppm, and lower than heretofore used, effectively suppresses blooms in surface bacteria for at least a period of three days post-slaughter. Assay of bacterial numbers at selected carcass sites was performed as follows:

Sterile aluminum templates, each having a 2.0 square inch aperture, were tag-pinned at randomly selected sites on beef carcass surfaces. Carcass halves were divided into chlorine dioxide treated and untreated control groups, with templates being affixed at corresponding positions on each treated and untreated carcass half.

At zero time, the carcass areas inscribed by each such template aperture were swabbed for 15 seconds with sterile polyester swab tips moistened in 0.1% peptone (Difco). Swab tips were then individually agitated in 1.5 ml sterile 0.1% peptone to release adherent bacteria, and 0.1 ml aliquots of serial tenfold dilutions in 0.1% peptone of this solution were plated by spreading on Plate Count Agar and MacConkey Agar. In these tests, zero time means prior to intermittent spray application during chill, but following an initial carcass wash with a solution of identical chlorine dioxide concentration.

After three days post-slaughter, the same template aperture sites were again swabbed, and swab specimens were diluted and plated as hereinabove described. Plated bacteria were incubated two to three days at room temperature to permit countable colonies to develop. The number of bacteria present in swabs, etc. is herein equated with colony forming units (CFU) arising in agar plates.

It will be apparent that the first swab at a particular site will remove some bacteria, but leave residual bacteria, which in turn are partially removed upon second swabbing. The efficiency of the swab procedure was determined as follows: sterile aluminum templates were affixed to carcass surfaces and their apertures swabbed as hereinabove described. Immediately thereupon, the outer 5.0 mm of carcass tissue inscribed by template apertures was asceptically excised, and homogenized for 2 minutes in 25.0 ml sterile 0.1% peptone. Serial dilutions of the homogenate in 0.1% peptone were plated on Plate Count Agar. Swab efficiency in percent is calculated by dividing the number of total bacteria (CFU) recovered from the swab by the sum of that number and the total number of bacteria present in the homogenate (CFU), and multiplying by 100. As empirically determined, average swab efficiencies were 38 percent; that is, 38 percent of initial contaminating bacteria were removed by the swab. Only a very few swab efficiency values were as low as 25 percent or as high as 75 percent.

In analyzing and interpreting results, let a equal the number of contaminating organisms actually present on any particular 2.0 square inch area of meat surface. Based on an average swab efficiency of 38 percent, the number of organisms removed on a first swab is 0.38 a, leaving a residual population of 0.62 a bacteria. Assuming no growth or other increase in bacterial numbers over the interval between the first and second swab, a second swab will remove 38 percent of those bacteria remaining, or 0.38 (0.62 a) organisms. The apparent $\log_{10}$ difference in bacterial counts recovered from the two swabs is: $\log_{10} 0.38$ a $- \log_{10} (0.38)(0.62$ a$) = -\log_{10} (0.38$ a$)/0.38(0.62$ a$) = -0.2076$ logs. Any meat site having a non-growing bacterial population will thus show an apparent average 0.2076 $\log_{10}$ decrease in bacterial counts.

Correspondingly, assume that following a first swab, a carcass site is treated with a bactericidal solution resulting minimally in an 80 percent reduction in bacterial numbers. This leaves 20 percent, or 0.2 (0.62 a) residual bacteria. A second swab will remove 38 percent of those bacteria remaining, or (0.38)(0.2)(0.62 a) organisms. The apparent $\log_{10}$ difference in bacterial counts recovered from the two swabs is: $\log_{10} 0.38$ a $-\log_{10} (0.38)(0.2)(0.62$ a$) = -\log_{10} 0.38$ a$/(0.38)(0.2)$ $(0.62$ a$) = -0.9065$ logs. Any meat site upon which 80 percent of the bacteria are killed after removing the first swab sample will thus show an apparent average 0.9065 $\log_{10}$ decrease in bacterial counts.

A bloom in surface bacteria, as hereinabove set forth, is defined as 1.0 $\log_{10}$ apparent increase in bacterial numbers, and a partial bloom as 0.5–1.0 $\log_{10}$ such increase, utilizing this assay.

TABLE 1

| | Bacterial Counts* | | | |
|---|---|---|---|---|
| | Zero | 3 days | $\log_{10}$ Change | Bloom** |
| A. | Untreated Carcasses | | | |
| 1. | 3.6532/2.3522 | 4.0530/3.1973 | +0.3998/+0.8451 | −/± |
| 2. | 4.9685/3.8388 | 5.5740/4.7202 | +0.6055/+0.8814 | ±/± |
| 3. | 4.8293/3.2945 | 3.5185/4.2833 | +0.6892/+0.9888 | ±/± |
| 4. | 4.4983/2.0792 | 5.4983/3.3222 | +1.0000/+1.2430 | +/+ |
| 5. | 3.5740/2.0000 | 4.7324/3.1761 | +1.1584/+1.1761 | +/+ |
| 6. | 4.4314/2.9542 | 5.2405/4.0845 | +0.8091/+1.1304 | ±/+ |
| 7. | 5.4983/3.7993 | 5.7201/3.9395 | +0.2219/+0.1402 | −/− |
| 8. | 4.2900/3.3802 | 5.3064/3.6230 | +1.0164/+1.2430 | +/+ |
| 9. | 4.1399/2.0000 | 5.2659/3.1399 | +1.1260/+1.1399 | +/+ |
| 10. | 4.8096/3.5011 | 4.8388/3.6532 | +0.0292/+0.0621 | −/− |
| B. | Carcass Halves Treated with 0.8 ppm Chlorine Dioxide | | | |
| 1. | 5.1055/3.2900 | 5.3064/3.9890 | +0.2009/+0.6990 | −/± |
| 2. | 4.4456/2.8573 | 4.3404/2.0000 | −0.1032/−0.8573 | −/− |
| 3. | 5.0952/4.1583 | 5.0334/3.0791 | −0.0618/−1.0746 | −/− |
| 4. | 3.4983/2.5185 | 3.5434/2.6532 | +0.0451/+0.1347 | −/− |
| C. | Carcass Halves Treated with 1.5 ppm Chlorine Dioxide | | | |
| 1. | 2.5185/n.s.*** | 2.1761/n.s. | −0.3425/n.s. | −/− |
| 2. | 4.9642/3.7993 | 4.8293/3.5911 | −0.1248/−0.1972 | −/− |
| 3. | 3.1072/n.s. | 2.5562/n.s. | −0.6409/n.s. | −/− |
| 4. | 4.8751/3.6074 | 4.5378/2.8751 | −0.3373/−0.7323 | −/− |
| D. | Carcass Halves Treated with 2.0 ppm Chlorine Dioxide | | | |
| 1. | 5.4728/4.1055 | 4.7442/3.7993 | −0.7285/−0.3061 | −/− |
| 2. | 3.3936/n.s. | 3.1538/n.s. | −0.2398/n.s. | −/− |
| 3. | 5.3522/3.0951 | 3.2659/2.0000 | −2.0852/−1.1408 | −/− |
| 4. | 3.3607/n.s. | 3.0951/n.s. | −0.2655/n.s. | −/− |
| E. | Carcass Halves Treated with 3.5 ppm Chlorine Dioxide | | | |
| 1. | 4.6946/2.5740 | 4.7993/2.5563 | +0.1047/−0.0169 | −/− |
| 2. | 3.7202/n.s. | 2.9754/n.s. | −0.7448/n.s. | −/− |
| 3. | 3.8573/2.6075 | 3.2900/2.4314 | −0.5675/−0.1761 | −/− |
| 4. | 4.1105/3.3522 | 4.1973/3.6675 | +0.0867/+0.3152 | −/− |
| F. | Carcass Halves Treated with 4.5 ppm Chlorine Dioxide | | | |
| 1. | 4.7993/n.s. | 3.3434/n.s. | −1.4559/n.s. | −/− |
| 2. | 4.1941/3.1303 | 3.5670/2.0212 | −0.6261/−0.1091 | −/− |
| 3. | 5.2553/4.2589 | 3.4548/2.2553 | −1.8005/−2.0036 | −/− |
| 4. | 3.1972/n.s. | 2.9004/n.s. | −0.2968/n.s. | −/− |

*Bacterial counts in $\log_{10}$. Values to the left of the slash indicate bacterial counts on Plate Count Agar; numbers to the right of the slash indicate counts on MacConkey Agar.

**A plus sign indicates a bloom, that is, 1.0 $\log_{10}$ or more increase in bacterial numbers; a plus/minus sign indicates a partial bloom, that is, 0.5–1.0 $\log_{10}$ similar increase; a minus sign indicates no bloom, that is, less than 0.5 $\log_{10}$ increase or net decrease in counts.

***n.s. means CFU too low to be significant.

Table 1 summarizes representative data for carcass halves, divided into chlorine dioxide treated and untreated groups, and assayed at zero time and at three days post-slaughter, according to the technique hereinabove set forth. Chlorine dioxide solutions were applied to treated carcass halves in a typical, conventional intermittent spray cycle. Spray was directed downwardly onto carcass halves from overhead spray nozzles in 1 minute pulses at 15 minute intervals during the first 6.5 hours of carcass chill, for a total exposure time of 26 minutes.

The data of Table 1 indicate that treatment of meat carcasses with aqueous chlorine dioxide in a concentration of 0.8 to 4.5 ppm effectively suppresses blooms in surface bacteria for at least three days post-slaughter. To validate this hypothesis, a chi-squared test was performed utilizing this data and other similar data (not shown) deemed redundant for illustrative purposes. Table 2 hereof summarizes this combined data.

TABLE 2

| Number of Carcasses | Blooms | Partial Blooms | No Bloom |   | Total |
|---|---|---|---|---|---|
| Untreated | 19 | 8 | 12 | = | 39 |
| Treated | 1 | 4 | 26 | = | 31 |
| Total | 20 | 12 | 38 | = | 70 |

The chi-squared statistic, with two degrees of freedom, is 22.1, which is highly significant (p 0.005). It is concluded that treatment of contaminated meat with 0.8 to 4.5 ppm chlorine dioxide profoundly reduces the likelihood of bloom development. Further statistical analysis comparing bloom suppression at various chlorine dioxide concentrations indicates substantial uniformity in effect within this concentration range.

Treatment of meat at a concentration of 0.5 ppm is also effective in suppressing bacterial blooms; however, there are a higher number of partial blooms at this concentration than at 0.8 ppm. At concentrations substantially less than 0.5 ppm effectiveness rapidly diminishes, and blooms may become more frequent than on untreated control carcasses because of increased water activity ($A_w$) at the meat surface. Although slight bacterial growth may occur at some carcass sites treated with 0.5 to 4.5 chlorine dioxide, such growth is significantly less than the increases characteristic of prespoilage blooms and partial blooms.

In the foregoing tests utilizing 0.5 to 4.5 ppm chlorine dioxide, reliable 3 day reductions in bacterial counts were less than 0.9065 logs, the predicted minimum bactericidal value. Conventionally, however, bactericidal efficacy is measured immediately after 20 to 24 hour chill instead of at 3 days post-slaughter. Corresponding control tests which demonstrate the sub-bactericidal effect of chlorine dioxide in the concentration range of the present process, are accordingly described hereinafter in Example II.

In these tests, swab specimens were plated on Plate Count Agar and MacConkey Agar. Plate Count Agar is a nutritionally rich medium which supports the growth of most aerobic bacteria. MacConkey Agar contains bile salts and crystal violet which inhibit the growth of Gram positive organisms and many other non-spoilage species; however, it is specifically permissive for Pseudomonas, Aeromonas, Flavobacterium, and most other Gram negative genera associated with meat spoilage. It is apparent from the data of Table 1 hereinabove that spoilage organisms comprise a minor portion of the initial bacterial load on carcass surfaces. These data further indicate that an apparent bloom in total counts cannot always be accounted for solely by a corresponding bloom in the spoilage classes of bacteria. However, the data of Parts B–F demonstrate that bloom suppression in all sub-populations of bacteria, and specifically in genera associated with spoilage, is achieved utilizing sub-bactericidal concentrations of chlorine dioxide.

EXAMPLE II

Table 3 summarizes the results of tests identical in format to those of Example I hereof, except that a second swab specimen was removed immediately at the end of the chill cycle approximately 20 hours post-slaughter.

TABLE 3

| | Bacterial Counts* | | | |
|---|---|---|---|---|
| | Zero | 20 Hours | $Log_{10}$ Change | Bloom** |
| A. | | Untreated Carcasses | | |
| 1. | 3.0792/2.7993 | 3.4771/2.0414 | +0.3999/−0.7579 | −/− |
| 2. | 4.0792/n.s.*** | 4.4149/n.s. | +0.3357/n.s. | −/− |
| 3. | 4.7924/3.4472 | 5.0414/3.2305 | +0.2490/−0.2168 | −/− |
| 4. | 5.0414/3.1139 | 5.0792/3.1463 | −0.0378/−0.0324 | −/− |
| 5. | 3.8513/n.s. | 4.2304/n.s. | +0.3791/n.s. | −/− |
| 6. | 3.7853/—# | 4.9345/— | +1.1492/— | +/ |
| 7. | 3.9345/2.3010 | 4.3010/2.0414 | +0.3665/−0.2596 | −/− |
| 8. | 4.4314/2.8451 | 4.7634/3.9638 | +0.3320/+1.1187 | −/+ |
| B. | Carcass Halves Treated with 2.0 ppm Chlorine Dioxide | | | |
| 1. | 4.8388/3.7924 | 4.2304/2.7853 | −0.0684/−1.0071 | −/− |
| 2. | 4.7482/n.s. | 4.4149/n.s. | −0.3333/n.s. | −/− |
| C. | Carcass Halves Treated with 3.0 ppm Chlorine Dioxide | | | |
| 1. | 4.0334/n.s. | 4.1973/n.s. | +0.1639/n.s. | −/− |
| 2. | 3.3664/n.s. | 3.3802/n.s. | +0.0138/n.s. | −/− |
| 3. | 3.7202/n.s. | 3.8573/n.s. | +0.1371/n.s. | −/− |
| 4. | 3.8921/n.s. | 3.7782/n.s. | −0.1139/n.s. | −/− |
| 5. | 3.4548/n.s. | 3.7559/n.s. | +0.3011/n.s. | −/− |
| 6. | 3.3010/n.s. | 3.7513/n.s. | +0.4503/n.s. | −/− |
| 7. | 3.4149/— | 2.6128/— | +0.8021/— | −/ |
| 8. | 5.1761/— | 5.2195/— | +0.0434/— | −/ |
| D. | Carcass Halves Treated with 4.0 ppm Chlorine Dioxide | | | |
| 1. | 3.4771/2.3522 | 3.7202/2.3010 | +0.2431/−0.0512 | −/− |
| 2. | 5.0952/2.4771 | 4.8482/2.5740 | −0.2470/+0.0969 | −/− |
| 3. | 4.4433/2.4314 | 4.3096/2.3522 | −0.1337/−0.0792 | −/− |
| 4. | 4.2175/2.3522 | 4.1303/2.4983 | −0.0872/+0.1461 | −/− |
| 5. | 3.7482/— | 3.4471/— | −0.3011/— | −/− |
| 6. | 5.1461/2.7403 | 4.6628/2.6021 | −0.4883/−0.1382 | −/− |
| E. | Carcass Halves Treated with 5.0 ppm Chlorine Dioxide | | | |
| 1. | 3.3936/n.s. | 2.6074/n.s. | −0.7862/n.s. | −/− |
| 2. | 4.0212/n.s. | 2.5185/n.s. | −1.5027/n.s. | −/− |
| 3. | 4.9912/2.1761 | 3.9395/n.s. | −1.0517/— | −/− |
| 4. | 4.7559/2.9165 | 3.4314/2.7782 | −1.3245/−0.1383 | −/− |
| 5. | 3.7924/2.5563 | 2.6128/n.s. | −1.1796/— | −/− |

*Bacterial counts in $log_{10}$; values to the left of the slash indicate bacterial counts on Plate Count Agar; values to the right of the slash indicate bacterial counts on MacConkey Agar.
**Plus sign indicates bloom, or 1.0 $log_{10}$ increase in bacterial numbers; minus sign indicates no bloom, or less than 0.15 $log_{10}$ increase in bacterial numbers.
***CFU too low to be significant.
Not plated.

The data of Part A of Table 3 shows that blooms develop on only about 10 percent of untreated carcass sites after 20 hours chill, compared to a corresponding 50 percent of such sites 3 days post-slaughter (See Table 2 hereinabove). Contaminating bacterial populations thus appear to have a substantial latent or lag period after deposition on meat surfaces. This is surprising because blooms in non-spoilage species as well as known psychrotrophes become prevalent generally at 3 days and long after carcasses have attained refrigerated temperatures.

Bactericidal reductions in the meat slaughtering field ideally should be upwardly 90 percent, as disclosed in U.S. Pat. No. 4,021,585 (Svoboda, et al.). The predicted apparent difference in total bacterial counts utilizing the assay hereinabove described and corresponding to a 90 percent reduction in counts is $-1.2076$ logs, following the derivation of Example I: $\log_{10} 0.38 a/(0.38)(0.1)(0.62 a) = 1.2076$.

Referring to part E of Table 3, chlorine dioxide in a control concentration of 5.0 ppm results in reductions in total bacterial counts (counts on Plate Count Agar) exceeding 1 $\log_{10}$. An average of the values therein set forth is $-1.1689$ which closely approximates the predicted theoretical value of $-1.2076$. It is concluded that 5.0 ppm chlorine dioxide is bactericidal in agreement with data disclosed in U.S. Pat. No. 4,021,585 (Svoboda, et al.).

However, the data of Parts B–D demonstrate that treatment of carcasses with 1.0 to 4.0 ppm chlorine dioxide fails to result in either minimally bactericidal reductions ($-0.9065$ logs) or ideal bactericidal reductions ($-1.2076$ logs), as determined immediately after chill.

Net changes in bacterial numbers at 20 hours are not appreciably different than at 3 days. This strongly suggests that chlorine dioxide at sub-bactericidal concentrations act upon bacteria at a very early stage of spoilage prior to commencement of vegetative growth. These bacteria, while not killed, are disabled functionally, and their development on a meat substrate is aborted up to at least 3 days after the treating agent is dissipated. Their presence, however, may have important prophylactic value in preventing establishment of pathogens or new spoilage contaminants introduced subsequently.

EXAMPLE III

The following tests compare the rates of chlorine dioxide or hypochlorous acid reaction with fat alone or supplemented with linolenic acid, a long chain fatty acid containing three double bonds. These tests were performed according to the following general format simulating the two phase (liquid-solid) interaction of an aqueous chlorinating agent at the fat-containing surface of animal carcasses:

7.0 g of molten, whole, freshly rendered, beef fat were layered onto the bottom of each of several screw-capped 125 ml flasks, and allowed to solidify at room temperature. 15.0 ml of an aqueous solution containing various concentrations of hypochlorous acid (HOCl) or chlorine dioxide ($ClO_2$) were then individually pipetted onto the fat layers. The flasks were incubated at room temperature with gentle agitation (100 rpm) in a rotary shaker. At various times after the addition of the chlorinating agent, aliquots were withdrawn and assayed conventionally for the appropriate residual oxychlorine species remaining in the supernatant solution. In these tests, disappearance of the chlorinating agent is equated with the formation of total reaction products plus the gaseous escape of the agent into the headspace of the flask.

TABLE 4

| Trial No. | 1 | 2 | 3 | 4 | 5 | 6 |
|---|---|---|---|---|---|---|
| A. Reaction of HOCl/$ClO_2$ with Fat Plus/Minus Linolenic Acid ||||||| 
| Beef fat (7.0 g) | + | + | + | + | – | – |
| Linolenic Acid (8%) | – | – | + | + | – | – |
| HOCl (ppm) | 300 | – | 300 | – | 300 | – |
| $ClO_2$ (ppm) | – | 325 | – | 325 | – | 325 |
| Concentration (ppm) |||||||
| 0 Time | 300 | 325 | 300 | 325 | 300 | 325 |
| 2.0 Hour | 120(40)* | 190(58) | 30(10) | 180(55) | 280(93) | 239(70) |
| 3.0 Hour | 50(17) | 175(54) | 0(0) | 160(49) | 270(90) | 210(63) |
| B. Reaction of $ClO_2$ with Fat First Depleted by HOCl/$ClO_2$ |||||||
| Beef fat (7.0 g) | + | + | + | + | – | – |
| First | HOCl | – | $ClO_2$ | $ClO_2$ | – | – |
| Second | $ClO_2$ | $ClO_2$ | $ClO_2$ | HOCl | $ClO_2$ | HOCl |
| Concentration (ppm) |||||||
| 0 Time | 93 | 93 | 93 | 220 | 93 | 220 |
| 1.5 Hour | 88(95) | 78(84) | 93(100) | 180(82) | 93(100) | 220(100) |
| 3.0 Hour | 70(76) | 57(62) | 73(79) | 170(78) | 70(76) | 210(96) |
| 5.0 Hour | 65(70) | 40(44) | 68(74) | 150(69) | 60(65) | 210(96) |
| C. Reaction of $ClO_2$ with Fat |||||||
| Initial $ClO_2$ Conc. | 275* | 85** | | | | |
| 0.5 Hour | 170(62) | 55(65) | | | | |
| 1.0 Hour | 150(55) | 40(48) | | | | |
| 1.5 Hour | 110(40) | 35(42) | | | | |
| 2.5 Hour | 95(35) | 27(32) | | | | |
| 3.5 Hour | 65(24) | 18(22) | | | | |

*Values in parentheses equal percent of starting concentration.
**Average of values obtained from two independent experiments.

Referring to Part A of Table 4, it is apparent that hypochlorous acid reacts more readily than chlorine dioxide with whole beef fat. Most of the observed decrease in HOCl concentration in the presence of fat (column 1, Part A) is attributable to chemical reaction with the fat layer, since only a small portion of the agent is flashed off into the headspace (see control in the absence of fat, column 5, Part A). In contrast, most of the observed decrease in chlorine dioxide concentration in the presence of fat (column 2, Part A) is attributable to flashing off of the agent (compare column 6 to column 2).

Ordinary animal fat contains no greater than approximately 42.0 percent unsaturated fatty acids having at least one double bond. Addition to the fat portion of 8 percent (w/w) linolenic acid (containing three double bonds) thus enriches the double bond content of the fat layer. Comparison of the data of column 1 with that of column 3 shows that double bond enrichment greatly enhances the reaction rate of hypochlorous acid. In contrast, the rate of reaction between chlorine dioxide and enriched fat is not appreciably increased over the rate observed for fat alone (comparison of column 2 with column 4). It is concluded that chlorine dioxide reacts very slowly with fatty acid double bonds compared to hypochlorous acid.

Referring to Part B of Table 4, the procedure of Part A was modified as follows: Layered fat was first exposed to saturating amounts of hypochlorous acid or chlorine dioxide by reacting the fat with an excess of the respective agent. The flask was then rinsed thoroughly with distilled water, and a second solution (15 ml) containing the same or different chlorinating agent was introduced. The concentration of the second such solution was monitored over a time course (as in the experiment of Part A). The results indicate that pre-reacting the fat with excess hypochlorous acid effectively inhibits further reaction by chlorine dioxide (compare data of column 1 with control in column 5, and with column 3 wherein fat is not pre-reacted. This suggests that hypochlorous acid attacks substantially all of the fat substrate moieties otherwise available to chlorine dioxide, thereby depleting them.

Conversely, pre-reacting fat wih chlorine dioxide fails to prevent further substantial reaction of the fat with hypochlorous acid (compare data of column 4 with control in column 6). The results of Part A suggest that this additional reactivity may be due at least in part to the greater affinity of hypochlorous acid to fatty acid double bonds.

Referring to Part C of Table 4, the rate of reaction of chlorine dioxide in simple reaction with fat appears to be substantially independent of initial concentration. The rate of disappearance of the agent is approximately the same at 275 ppm as at 85 ppm, as shown by comparing the percent remaining of the agent at various times. This suggests that reaction kinetics is very nearly first order with respect to concentration, indicating that the levels of reaction products formed in unit time are linearly proportional to concentration. Levels of total reaction products formed at sub-bactericidal concentrations of chlorine dioxide will be less than the levels formed at higher bactericidal concentrations. Use of chlorine dioxide at sub-bactericidal concentrations, and instead of hypochlorous acid, will thus minimize residues of organic reaction by-products in freshly slaughtered sanitized meat.

I claim:

1. The process of avoiding proliferation of bacteria on freshly slaughtered meat carcass surfaces, selected from the group consisting of beef, pork, lamb and veal carcass surfaces, comprising the steps of:
   forming an aqueous solution of chlorine dioxide in a concentration of 0.5 to 4.0 ppm,
   said concentration being substantially sub-bactericidal yet great enough to substantially suppress bloom development of such bacteria on said meat carcass surfaces, and
   applying said solution to said meat carcass surfaces by intermittent spraying during chilling.

2. The process of avoiding proliferation of bacteria on freshly slaughtered meat carcass surfaces, selected from the group consisting of beef, pork, lamb and veal carcass surfaces, comprising the steps of:
   forming an aqueous solution of chlorine dioxide in a concentration of 0.5 to 4.0 ppm,
   said concentration being substantially sub-bactericidal yet great enough to substantially suppress bloom development of such bacteria on said meat carcass surfaces, and
   applying said solution to said meat carcass surfaces by continuous misting during chilling.

3. The process of claim 1 or 2, together with the subsequent step of:
   applying the said solution to said meat carcass surfaces during prolonged storage,
   whereby to suppress bloom development of such bacteria at remote times post-slaughter.

* * * * *